(12) United States Patent
Mazyar et al.

(10) Patent No.: US 9,090,012 B2
(45) Date of Patent: Jul. 28, 2015

(54) PROCESS FOR THE PREPARATION OF CONFORMABLE MATERIALS FOR DOWNHOLE SCREENS

(75) Inventors: Oleg A. Mazyar, Houston, TX (US); Michael H. Johnson, Katy, TX (US); Randall V. Guest, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 315 days.

(21) Appl. No.: 12/981,748

(22) Filed: Dec. 30, 2010

(65) Prior Publication Data
US 2012/0168977 A1    Jul. 5, 2012

(51) Int. Cl.
| | |
|---|---|
| C08J 9/00 | (2006.01) |
| B29C 44/34 | (2006.01) |
| B29B 7/40 | (2006.01) |
| B29B 7/74 | (2006.01) |
| E21B 43/08 | (2006.01) |
| E21B 43/10 | (2006.01) |
| B01F 7/00 | (2006.01) |

(52) U.S. Cl.
CPC ............ *B29C 44/3442* (2013.01); *B29B 7/407* (2013.01); *B29B 7/7404* (2013.01); *E21B 43/08* (2013.01); *E21B 43/103* (2013.01); *B01F 7/00816* (2013.01); *C08J 2375/04* (2013.01)

(58) Field of Classification Search
USPC .......... 264/413, 415, 478, 45.1, 54, 628, 645, 264/240, 241, 260, 297.2, 328.1
See application file for complete search history.

(56) References Cited

U.S. PATENT DOCUMENTS

| | | | |
|---|---|---|---|
| 3,051,455 A * | 8/1962 | Magester | 366/172.1 |
| 4,517,313 A | 5/1985 | Nakatani | |
| 4,525,491 A | 6/1985 | Narisawa et al. | |
| 4,866,103 A * | 9/1989 | Cassidy et al. | 521/159 |
| 5,908,072 A | 6/1999 | Hawkins | |
| 5,958,991 A * | 9/1999 | Bartlett, Jr. | 521/131 |
| 7,230,037 B2 * | 6/2007 | Sulzbach et al. | 521/170 |
| 7,318,481 B2 | 1/2008 | Richard | |
| 2006/0131791 A1 * | 6/2006 | Nakamura et al. | 264/413 |
| 2010/0089565 A1 * | 4/2010 | Duan et al. | 166/51 |

OTHER PUBLICATIONS

International Search Report and Written Opinion; International Application No. PCT/US2011/065842; International Filing Date: Dec. 19, 2011; Date of Mailing: Aug. 14, 2012; 11 pages.
Myung Sool Koo et al., "Reaction Injection Molding of Polyurethane Foam for Improved Thermal Insulation," Polymer Engineering and Science, Jul. 2001, vol. 41, No. 7, pp. 1177-1186.

* cited by examiner

*Primary Examiner* — Stella Yi
(74) *Attorney, Agent, or Firm* — Cantor Colburn LLP

(57) ABSTRACT

A process of making a foamed conformable material by reaction injection molding comprises providing a first component from a first feed tank at a first flow rate, via a first conduit, to a mixing device; providing a second component from a second feed tank at a second flow rate, via a second conduit, to the mixing device, the second component reactive with the first component in the presence of a foaming agent; mixing the first component and the second component in the mixing device to form a reaction mixture; introducing the reaction mixture into an injection molding device; molding the reaction mixture to form a foamed conformable material; wherein the mixing of the reaction mixture is adjusted to achieve a desired average cell size of the foamed conformable material. The process can produce wellbore-conforming materials that can function to filter out sand or other undesirable fines from a formation.

21 Claims, 5 Drawing Sheets

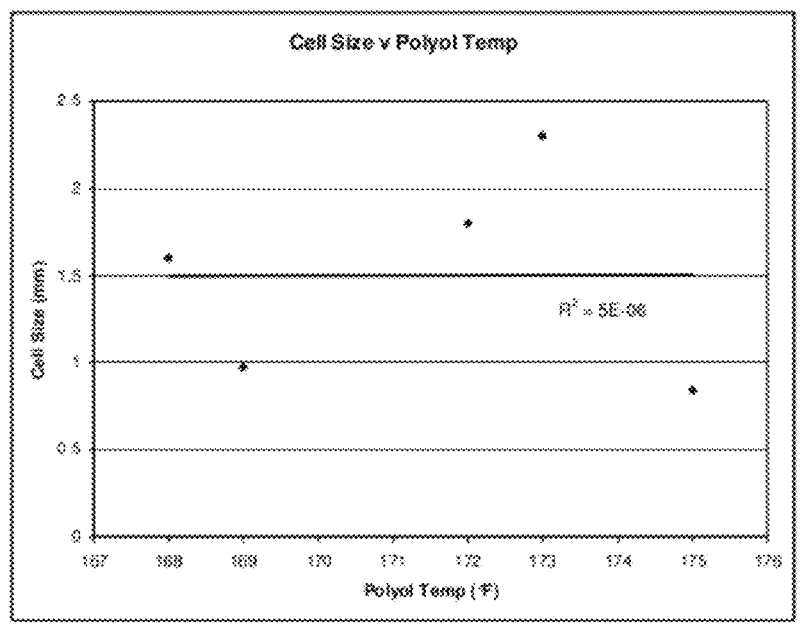
FIGURE 4(a)
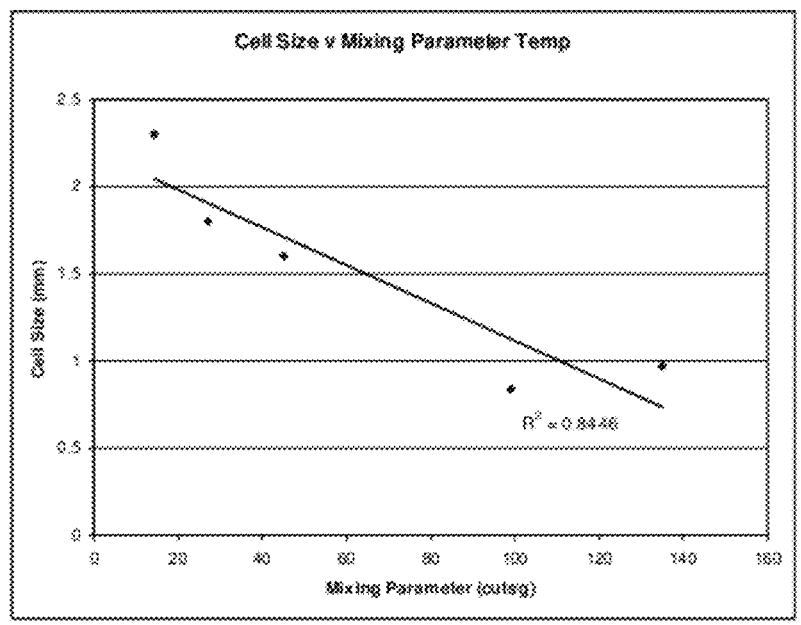
4(b)

PROCESS FOR THE PREPARATION OF CONFORMABLE MATERIALS FOR DOWNHOLE SCREENS

FIELD OF THE INVENTION

The field of this invention relates to materials for downhole screens and, more particularly, materials that can be expanded to fill the annular gap in a regularly or irregularly shaped borehole. The material is foamed to obtain a preselected cell size to facilitate screened production flow through the conformable material.

BACKGROUND OF THE INVENTION

Various methods of wellbore isolation, screen filtration, and production control are known in the art, including applications in the field of oil and gas exploitation. In the past, the annular space in a borehole, outside the screen of a tubing string, was filled with gravel to prevent the production of undesirable sand and other fines from a formation. More recently, with the advent of tubular expansion technology, it was thought that the need for gravel packing could be eliminated if the screen could be expanded in place to eliminate the surrounding annular space that had heretofore been packed with gravel. Problems arose with the screen expansion technique as a replacement for gravel packing because of wellbore shape irregularities. Subsequently, therefore, the use of conformable materials for such applications have been disclosed. The conformable material, in the form of an annular layer around the screen or other support of a tubing string, expands sufficiently after being run into the wellbore in order to contact the wellbore and fill the surrounding annulus. For example, various screen assemblies have been designed with an outer layer that can conform to the borehole shape upon expansion. Such designs are described in U.S. Patent Pub. 2009/0130938; U.S. Pat. No. 7,318,481; and US Patent Pub. 2010/0089565. In one embodiment, a material is selected that will expand after being contacted with wellbore fluids.

Self-conforming expandable screens comprising thermosetting open-cell shape-memory polymeric foam have been disclosed. Shape-memory materials are materials that have the ability to return from a deformed state (temporary shape) to their original (permanent) shape induced by an external stimulus or trigger. The shape memory effect of these materials can be triggered, for example, by temperature change, an electric or magnetic field, light, change in pH, or other means. Shape-memory materials typically comprise viscoelastic polymers that can exist in two distinct states, exhibiting either the properties of a glass (high modulus) or those of a rubber (low modulus).

Mechanical and filtration properties of the conformable material, capable of screening production flow, strongly depends on the microcellular structure, including average cell size. Such properties can also depend on pore throat geometry. One method of providing a microcellular structure is by foaming a polymer. However, controlling a foaming process has been difficult and unpredictable. Thus, there is a need for an improved method of preparing a foamed conformable material having a desired pre-designed microcellular structure.

It would be very desirable and important to discover a method for preparing a foamed microcellular conformable material that can be deployed as an element at a particular location downhole in a wellbore, which material can achieve desired conformability and screening filtration for wellbore isolation and production control. Generally, greater versatility for such materials and their method of production is desired, as this provides more flexibility in screen assembly designs and provides the operator more flexibility in designing their placement and configuration for use in wellbores.

These and other advantages of the present invention will become more apparent to one skilled in the art from a review of the description of the preferred embodiment and the claims that appear below.

SUMMARY OF THE INVENTION

The present invention relates to a method of controlling the microcellular structure in conformable materials, comprising a foamed polymer composition, by varying the quality of component mixing during manufacture of the material.

In particular, the present invention relates to a process of making a wellbore-conforming screen material by reaction injection molding, the process comprising:

providing a first component from a first feed tank at a first flow rate, via a first conduit, to a mixing device;

providing a second component from a second feed tank at a second flow rate, via a second conduit, to the mixing device, wherein the second component is reactive with the first component, and wherein a foaming agent is present in the first component, second component, and/or is separately introduced into the mixing device;

mixing the first component and the second component in the mixing device to form a reaction mixture;

introducing the reaction mixture into an injection molding device; and molding the reaction mixture to form a foamed material;

wherein the mixing of the reaction mixture is adjusted or controlled to effectively achieve a desired preselected average cell size of the foamed material.

The size of the cells formed by the foamed conformable material can be adapted, with or without further processing of the material, to permit production flow while screening out undesirable sand or other fines.

In one embodiment of the present invention, the average cell size of a foamed polyurethane material is controlled by varying the quality of mixing of at least two components wherein one component comprises a polyol and a second component comprises an isocyanate compound. The resulting material is capable of conforming to a borehole shape after insertion into the wellhole.

According to one specific embodiment of the process, the quality of the component mixing of the reaction mixture, in preparing the foamed conformable material, is adjusted by employing a mixing device comprising an impeller. In another embodiment of the process, the mixing device comprises a jet impingement mixer.

BRIEF DESCRIPTION OF THE DRAWINGS

FIG. 4(a) shows a graph in which cell size of a foamed conformable material is plotted versus the temperature of a polyol component of reaction mixture used in a reaction injection molding process, as described in Example 1;

FIG. 4(b) shows a graph in which cell size of a foamed conformable material is plotted versus a measure of mixing quality according to the present process, as described in Example 1;

FIGS. 5(a) and 4(b) show images of foamed conformable materials produced according to the present invention in which the mixing quality was varied employing jet impingement mixing, to produce (a) course cells and (b) fine cells, as described in Example 2.

DETAILED DESCRIPTION

Figure 1:
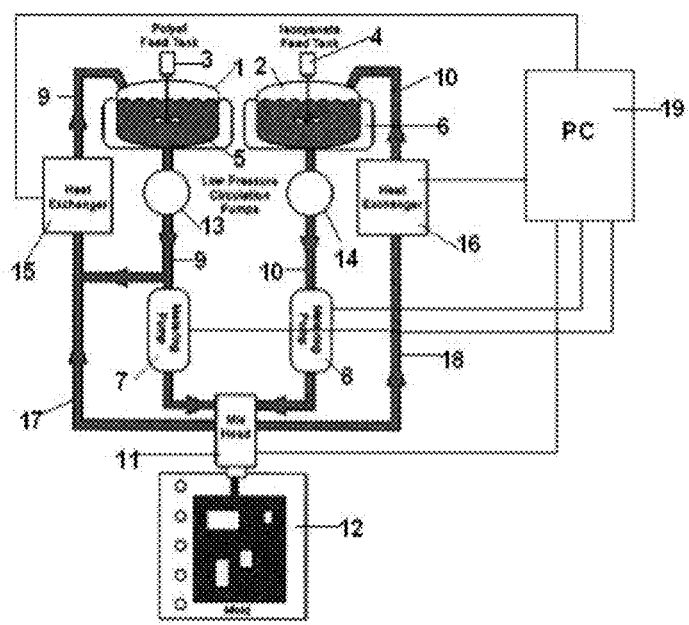
FIG. 1 is a schematic diagram of one embodiment of the reaction injection molding process of the present invention.

The mechanical and filtration properties of a foamed conformable material can strongly depend on its microcellular structure. It has been surprisingly found that the average cell size of a foamed conformable material can be effectively controlled, in a reaction injection molding (RIM) process, based on the quality of mixing of a first component and a second component in a mixing device. The reaction mixture can then be introduced into an injection molding device and molded to form the foamed conformable material. Applicants have found that increasing the quality of mixing (for a given composition of reactants and additives with otherwise fixed process conditions) in either jet impingement-based mixing heads or impeller-based mixing heads can lead to controlled formation of a smaller average cell size in the resulting foamed conformable material.

Thus, the mixing of the reaction components can be adjusted to achieve a desired average cell size of the foamed conformable material. In one embodiment, the average cell size of the foam is about 0.2 mm to 7 mm, preferably about 1 mm. By means of the present process, the same composition can be used to produce diverse foams of different average cell sizes by adjusting or changing the mixing quality. Alternatively, the process parameters can be set in a process for a given composition to obtain a preselected cell size. In one embodiment, the process is adjusted or controlled so that the foamed conformable material obtains a cellular microstructure that is capable of screening formation fluids in a wellbore, after expansion of the foamed conformable material in the wellbore. Screening filtration occurs at the interconnects between adjacent cells, i.e., at the pore throats.

The foamed conformable materials produced according to the present process can be made of a variety of polymeric materials, but is preferably one that expands on sustained exposure to well fluids to better conform to irregular shapes in a borehole. The foamed conformable material can comprise a thermosetting polymer composition. Typically, the conformable foamed materials will comprise at least 10 wt. %, based on total solids, of one or more polymers, specifically the polymeric reaction product of the components mixed in the process.

In one embodiment, the foamed conformable material is composed of a polymer material that is a viscoelastic shape-memory material. This kind of material has the property of being restored to its original shape and size, in a one-way process, when triggered, for example, by changing the temperature of the foam, by being exposed to well fluids for an extended period of time, or other triggering means.

Foamed conformable materials that can expand comprise a wide variety of polymers. Such polymers include shape memory polymer and can be a polyurethane, a polyamide, a polyurea, a polyvinyl alcohol, a vinyl alcohol-vinyl ester copolymer, a phenolic polymer, a polybenzimidazole, a copolymer comprising polyethylene oxide units, and combinations thereof. For example, copolymers comprising polyethylene oxide units include polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, and polyethylene oxide/poly(methyl methacrylate)/N-vinyl-2-pyrrolidone copolymer crosslinked with ethylene glycol dimethacrylate. In one embodiment, the foamed conformable material comprises a polyurethane made by reacting a polycarbonate polyol with a polyisocyanate. Such polymers can be chemically or at least physically crosslinked in order to have shape memory properties. A particularly preferred polymer is polyurethane. Polyurethane and polyurea polymers are advantageously produced in a RIM (reaction injection molding) process.

Foamed conformable materials can include a polymer blend. Depending on the particular application, such foamed conformable materials can exhibit advantageous mechanical properties compared to one comprised of pure homo- or copolymer resin.

Suitable physical foaming agents can be used in the present process, for example, $CO_2$, $N_2$, and HFC's. A blowing agent can be introduced through one or more ports of the polymer processing apparatus or can be generated within the reaction mixture. Chemical blowing agents can also be used. A preferred blowing agent is carbon dioxide, preferably generated by an in situ reaction of water.

Referring to FIG. 1, in a reaction injection molding process (RIM process), co-reactants are typically stored in separate feed tanks 1 and 2, optionally having suitable mixing means 3 and 4 and temperature insulating means, for example, a water jackets 5 and 6. The Components A and B, respectively, in tanks 1 and 2, are pumped, by metering pumps 7 and 8, via conduits 9 and 10 to heat exchangers 15 and 16, and then mixing head 11 connected to an reaction injection molding device 12.

The reaction injection molding system can also include circulating pumps 13 and 14 for return of components A and B to the mixing tanks 1 and 2 via heat exchangers 15 and 16 by means of circulating conduits 17 and 18. Conventional valves, mixers, tanks, and the like can be use in constructing the system, as will be appreciated by the skilled artisan.

Referring again to FIG. 1, the process optionally can include process control equipment in which a controller 19 (preferably a PLC or programmable logic controller) can be used to control the metering pump to obtain a desired volumetric, mass flow, or flow velocity. The controller can also be used to control the temperature of the heat exchangers 15 and 16 and, hence, the temperature of the component A and B entering the mixing head 11. As stated above, the two components can be mixed together in the mixing head either via jet impinging mechanism or with the help of an impeller mixer. In the case of a impeller mixer, the speed of the mixer can be controlled by electrical connection to the controller 19. Flow and temperature sensors can also be connected to the controller 19. Other process variables that can be controlled include mass flow rate of the components and pressure in the flow loop.

In one embodiment, for example, which can be sued in the preparation of a polyurethane foamed conformable material, di-isocyanate and polyol components are stored in separate feed tanks, wherein water, chain extenders, surfactants, and catalysts are premixed with polyol.

In general, polyurethane foams can be formed from a reactive composition comprising an organic polyisocyanate component reactive with a component having multiple hydroxyl groups, a foam stabilizing surfactant, and a catalyst. Organic polyisocyanates are of the general formula $Q(NCO)_i$, wherein i is an integer having an average value of greater than two, and Q is a polyurethane radical having a valence of i. $Q(NCO)_i$ is therefore a composition conventionally known as a prepolymer. Such prepolymers are formed by reacting a stoichiometric excess of a polyisocyanate as described above with the component having multiple hydroxyl groups, for example a polyhydroxyl-containing material as described below.

The amount of polyisocyanate used in the polyurethane-forming composition can vary, depending upon the particular application for which the polyurethane foam is being prepared. In general, the total —NCO equivalents to total active hydroxyl equivalents is such as to provide a ratio of 0.8 to 1.2 equivalents of —NCO per equivalent of active hydroxyl of the active hydroxyl reactant, and preferably a ratio of about 1.0 to 1.08 equivalents of —NCO per active hydroxyl.

The active hydroxyl-containing component can comprise a mixture of different types of active hydroxyl-containing components, including triols, diols, and compounds having an average hydroxyl functionality of greater than 3.

In one embodiment, the active hydroxyl-containing component can comprise a polyester polyol, polyether polyol, and/or polycarbonate polyol. Suitable polyester polyols are inclusive of polycondensation products of polyols with dicarboxylic acids or ester-forming derivatives thereof (such as anhydrides, esters and halides), polylactone polyols obtainable by ring-opening polymerization of lactones in the presence of polyols, and polycarbonate polyols obtainable by reaction of carbonate diesters with polyols. Of course, other natural and synthetic polyols can also be used, as will be appreciated by the skilled artisan. In one embodiment, the active-hydroxyl-containing component can be a linear polycarbonate polyols. They can be obtained by reacting glycols and cyclic esters of carbonic acid, for example, as disclosed in U.S. Pat. No. 4,131,731 to Lai et al.

In the case of a polyurethane foamed conformable material, in which polyurethane linkages —NH—CO—O— are produced in the reaction of a di-isocyanate and a polyol, the following reaction occurs upon mixing:

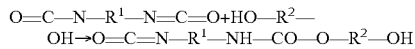

In the above reaction, $R^1$ and $R^2$ independently represent organic divalent radicals, depending on the specific starting materials. If a mixture of diols and triols is used, then the foamed polyurethane material will be crosslinked. A blowing agent such as carbon dioxide gas ($CO_2$) can be formed by reaction of water, at a content of less than 4 wt. % in the reaction mixture, with di-isocyanate monomer, according to the following reaction (in which $R^1$ and $R^2$ continue to be defined as before).

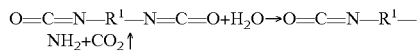

The amine in the above reaction can then react with further di-isocyanate to form urea linkages —NH—CO—NH— according to the following reaction:

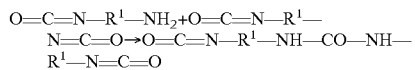

Thus, the resulting copolymer typically contains mostly polyurethane with some polyurea blocks. The situation can be even more complex, since the N—H bonds of both urethane and urea linkages can add to isocyanate groups to form allophanate and biuret linkages, which in turn can lead to branching and crosslinking of the polymer. Furthermore, trimerization of the isocyanate groups with formation of isocyanurates can also occur and serve as an additional source of branching and crosslinking. In addition to the complexity of chemical reactions involved in the polyurethane polymerization process, microcell formation can also be affected by surface tension and rheology of the reacting mixture.

For such a complex process, finding a direct relation between a particular processing condition and a resulting physical property of the foamed conformable material represents an important engineering discovery. Since mechanical characteristics of microcellular materials depend on the shape and structure of the cells, controlling the cell size in the foam allows for varying the mechanical properties of the foamed conformable material without making changes to the polymer itself. In the case of foamed conformable materials, specifically for sand screens in a wellbore, varying the cell size can also mean imposing a limit on the pore throat size and therefore adjusting the filtration properties of the sand screen.

Applicants have surprisingly found that increasing the mixing quality of separate reaction components by either jet impingement or impeller mixing, employing corresponding mixing devices or heads, leads to formation of smaller cell size microcellular foam materials. In particular, in one embodiment, when the mixing by impeller, a useful measure of mixing quality measure, specifically for screening applications involving foamed conformable materials, was found to be about 14-150 cuts/g, more preferably about 90 cuts/g. In another embodiment of the process, when the mixing by jet-impingement, a useful measure of mixing quality, specifically for screening applications involving foamed conformable materials, was found to be about 5-40 kg-m/s$^2$, preferably about 20 kg-m/s$^2$.

A desired mixing quality can be obtained by changing the flow rate of the first component, the flow rate of the second component, or both the flow rate of the first component and the flow of the second component in response to the desired average cell size in the foamed material. In the case of impeller mixing, variation in the rotation speed can also change the mixing quality. The flow rate can be controlled by a metering pump and the flow can be sensed by a flow meter, for example a mechanical, pressure-based, or optical flow meter. Other types of flow meters that can correct for varying temperature (i.e. density) conditions, non-linearities, and the characteristics of the fluid are also available, including magnetic and ultrasonic flow meters.

The temperature of the first component and/or the second component, besides affecting flow rates, can also affect the viscosity of the reaction mixture, which can effect cell formation. For example, in one particular embodiment involving a specific isocyanate/polyol reactant pair, the temperature of the first component (A) and the temperature of the second component (B), before being introduced into the mixing device, is adjusted to a first temperature in the range of 20 to 65° C., preferably about 30° C., and a second temperature in the range of 80 to 115° C., preferably about 87° C. respectively. In the case of a polyurethane foamed material, the second temperature applies to the hydroxyl-containing component (B). (Optionally, in the present process, hydroxyl groups in component (B) can be replaced with amino groups, in which case urea linkages result.) For control purposes, the temperatures of Components A and B can be sensed, for example, with a thermocouple.

Either automatic and/or manual control can be employed in the present process. For example, the temperature (and hence viscosity) of the first component and/or the second component can be automatically controlled in combination with the flow rates (for example, mass flow rate or flow velocity) of the first and second component, thereby affecting mixing quality.

Figure 2:
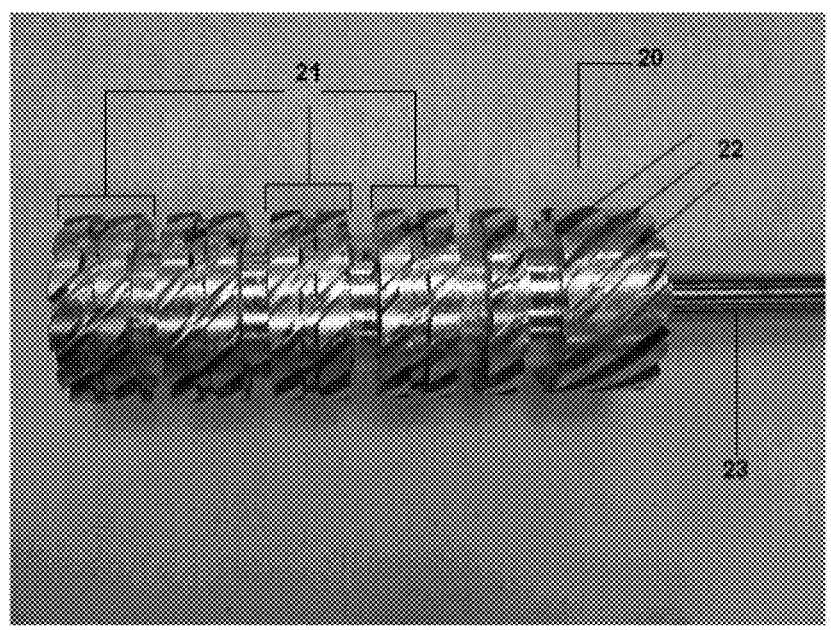
FIG. 2 shows a planar view of a rotary mixing head that can be employed in the reaction injection molding process of FIG. 1.

In the case of an impeller mixing, the quality of component mixing can be quantified by the value referred to as the "mixing energy," defined as the number of cuts the mixing head of the mixer makes through an element of the fluid being mixed in a period of time, which is proportional to the rotary speed of the mix head and inversely proportional to the mass flow rate of the components through the mixing head. This can be explained with reference to impeller mixing employing a rotary shearing type mixer 20, as shown in FIG. 2. The mixer 20 comprises a plurality of stages or banks 21 each having a plurality of helical cutters 22. This mixer connected to a shaft 23 fits in a housing (not shown) and rotates while the Components A and B are introduced near the stem of the shaft. Flow of the components forces the mixture to pass each stage of helical cutters. As each cutter moves through the components, the cutter slices through the components, pulling components through each other, interleaving the chemicals, mixing them.

The quality of mixing can be characterized by the total number of slices that the cutters make through a given portion of the mixture as it is pushed from inlet to outlet. This is a function of the dispense rate, the speed of the mixer, and the number of cutters on the mixer. Given the flow rate m' (g/s), the number of cutters in each bank of cutters $N_c$ (cuts/revolution/bank), the number of banks of cutters $N_b$ (banks), and the mixer speed $S_m$ (rev/min), an equation for cuts per gram for mixing element N is:

$$N = N_c \times N_b \times S_m / (60 \text{ s/min} \times m') \text{ (cuts/gram)} \quad (1)$$

The mixing quality parameter (cuts/gram) can be used during development testing for cell size to keep the contribution of mixing fairly constant (or to vary in a controlled way) while varying other process parameters, such as temperature, chemical components, or dispense rate.

For instance, sometimes it is necessary for processing reasons to vary the flow rate. This can happen, for instance, when checking the sensitivity of the final product's form to component temperature variation. When the component temperature is decreased, the viscosity increases and it is sometimes necessary to decrease the component flow rate to avoid problems with the pump. If the mixing quality is to be kept the same (to avoid variations caused by mixing quality), it is only necessary to maintain the same ratio of mixing head speed to component dispense rate.

The average cell size can also be affected by the formula (Including surfactants), the reaction (gel) rate, the blowing agent, and other factors. The reaction rate, in turn, is affected by the mixing quality, since for better mixing the reacting species are closer together on the average. When domains of the different components are large (poor mixing), the diffusion-limited reactions are slower than when the domains are smaller.

For impingement mixing in a process according to the present invention, Components A and B are introduced into a mixing chamber in such a way as to provide for the component streams to impinge each other. This can provide mixing by a highly turbulent flow. Efforts to quantify turbulent mixing have been reported in the literature, but the process is not yet well understood. See Y Huai and A Sadiki, *Analysis and Optimization of Turbulent Mixing with Large Eddy Simulation*, FEDSM2006-98416, Proceedings of the 2006 ASME Joint U.S.-European Fluids Engineering Summer Meeting, ASME, 2006, p 2.

Mixing quality in impinging flows have been considered heretofore with respect to the Reynolds number (Re=density×velocity×diameter/dynamic viscosity). See, for example, N A Mouheb, et al., *Numerical Study of the Flow and Mass Transfer in Micromixers*, ICNMM2008-62273, Proceedings of the Sixth International ASME Conference on Nanochannels, Microchannels and Minichannels, ASME, 2008, p 3. The Reynolds number is one of several dimensionless numbers used in the field of fluid mechanics as a means to index data, intended as a way to draw equivalencies between small scale and large-scale experiments. For instance, it is useful in determining the friction factor in pipe flow, where the diameter is understood to be the pipe diameter. To the extent to which the diameter in a mixing problem reflects the size of the impinging streams, the use of the Reynolds number is analogous to other uses. However, in the case of turbulent flow, the processes occur in a volume that is not necessarily determined by the diameter of the inlet tube of the mixer. Thus, the Applicants have developed an improved measure to use in the present process.

In inelastic collisions, kinetic energy is not conserved (deformation processes dissipate energy as heat and internal energy in the colliding bodies; total energy is conserved). During inelastic collisions, however, momentum is conserved. In addition, a change in momentum is directly related to applied forces:

$$F \partial t = \partial p \quad (2)$$

where F is force, t is time and p is momentum (mass×velocity). In an inelastic collision, the applied forces deform the colliding particles. In a fluid, a force applied in shear is related to the shearing rate through the viscosity of the fluid. Shearing in combined fluids is associated with mixing.

In order to use a quantity that is related to the mixing process in impingement mixing to index experimental results, the Applicants chose the rate of momentum change as such a quantity. For two fluids flowing together into a plenum (as in an impingement mixer), mixing and flowing out at right angles to the inflow directions, the rate of change in momentum is:

$$p' = m' \times V \quad (3)$$

The velocity V=m'/(density/flow area), so p'=(m')²/flow area/density. For impinging flows that do not have the same density, the momentum rate should be the same for each flow, as far as possible when considered with other process requirements. The momentum rate can be used as part of the initial condition specification during development, in a manner analogous to using "cuts per gram" with the previously discussed rotary mixing. However, mixing dynamics are affected by the viscosity of the fluid, which in turn can be affected by the temperature, filler quantity, and the like. Although affected by different setups and material changes, this momentum rate has proved an effective measure to use for development work, for example, with respect to a new formulation that is similar to a previously studied formulation.

In the case of jet impingement mixing, the quality of mixing can be controlled based on the injection rate of one of the components when the injection rate of the second component must be selected to provide the stoichiometric ratio. Trials can be used to draw rough equivalence between the impeller mixing (for a rotary mixing head) parameter (cuts/gram) and the chaotic mixing parameter (time rate of change of momentum).

Without wishing to be bound by theory, a possible explanation of the above-described correlations with respect to mixing quality is that, according to the Young-Laplace equation, the gas pressure in the smaller bubbles is higher for the same value of the surface tension. Therefore, bubbles on the interface with atmosphere prefer to grow, nucleate, or collapse reducing the gas pressure inside of them. The pressure within the bubbles of the layer adjacent to the interfacial cells becomes non-balanced and, thus, the inner layers of cells also tend to grow or nucleate. This growth can be limited by increased viscosity and surface tension of the reacting mixture as the polymerization progresses. Improved quality of mixing results in a larger number of contacts between the reactive cites of polyol and isocyanate, which promote the polymerization, leading to smaller foam cells. Improved quality of mixing also results in a larger number of contacts between water molecules and reactive sites of the isocyanate, leading to the formation of a larger number of nucleation sites for the $CO_2$-filled microbubbles. This also can contribute to the formation of a larger number of the foam cells with a smaller diameter.

Thus, the quality of mixing affects the polymerization reactions by aiding specie diffusion (better interleaving of components A and B). The temperature profile confirms that the reaction rates are affected by the quality of mixing. In turn, the heating rate due to the exotherm (influenced by quality of mixing) affects rheology. Crosslinks and linear links change the viscosity at any temperature, and the increasing temperature decreases viscosity as the reactions proceed.

In connection with the Young-Laplace mechanism of cell consolidation, surfactants (used to stabilize or destabilize cells) can vary in effectiveness depending on temperature. In addition, the cell piercing (destabilizing) efficiency is a function of cell wall thickness as well as a function of the state of gel (polymerization or cure). Hence, the temperature, influenced by the quality of mixing can be a useful tool for modifying the surfactant/polymer behavior. A pre-selected combination of process and chemistry can result in a desirable cell structure.

The relationship between cell size and quality of mixing can be affected by the formulation (or particular composition) of the reaction mixture. For example, when using one formulation, decreasing the component temperature and the quality of mixing was found to result in a slower exotherm resulting in larger cells. The difference in cell size was moderate and the resulting process was quite robust. When using another formulation containing a different surfactant type, however, there was an abrupt change in cell size when the mixing energy was decreased an increment in isocyanate injection rate from 1343 g/s to 895 g/s, but relatively less change resulted from further change to 448 g/s. Thus, different formulations can be characterized in terms of rate of change in average cell size in response to mixing quality.

In one embodiment, the process involves the preparation of a foamed polyurethane shape-memory conformable material, comprising mixing a first isocyanate portion (comprising an isocyanate) with a first polyol portion (comprising a polyol) in a pre-selected ratio of polyol to isocyanate to form a polyurethane material having a desired onset glass transition temperature (onset $T_g$). The method can additionally involve altering the geometric shape of the foam material at a temperature above the onset $T_g$ to change the original geometric shape to an altered geometric shape. Further, the method can involve lowering the temperature of the altered geometric shape of the material to a temperature below the onset $T_g$ where the material each maintains its respective altered geometric shape. Various ratios of polyol to isocyanate can be used to provide a polyurethane formulation having various onset $T_g$s. The slope change during the transition state from glass state to rubber state can also vary which would allow the altered geometric shapes of the shape-memory material to recover its original geometric shape at differing recovery rates, as disclosed in commonly assigned copending U.S. Patent Pub. 2010/0089565, hereby incorporated by reference in its entirety.

For improved thermal stability and hydrolysis resistance, polyurethane foamed conformable materials are preferably made from polycarbonate polyols and MDI diisocyanates. The composition of the polyurethane can be formulated to achieve different glass transition temperatures suitable to meet most downhole application temperature requirements.

In one specific embodiment, the polyurethane material is a shape-memory material that is extremely tough and strong and that is capable of being geometrically altered and returned to substantially its original geometric shape. The $T_g$ of the shape-memory polyurethane material can range from about 40° C. to about 200° C., and the material can be geometrically altered by mechanical force at 40° C. to 190° C.

In one embodiment, the foamed conformable materials made by the present process can thereafter be coated with a thermally fluid-degradable rigid plastic such as polyester polyurethane plastic and polyester plastic. By the term "thermally fluid-degradable plastic" is meant any rigid solid polymer film, coating or covering that is degradable when it is subjected to a fluid, e.g. water or hydrocarbon or combination thereof and heat. The covering can be formulated to be degradable within a particular temperature range to meet the required application or downhole temperature at the required period of time (e.g. hours or days) during run-in. The thickness of delay covering and the type of degradable plastics can be selected to be able to keep devices of shape-memory conformable material from recovery during run-in. Once the material, in a suitable screen assembly, is in place downhole for a given amount of time and temperature, the degradable plastic decomposes, which allows the devices to recover their original geometric shape or conform to the inner wall of the borehole. In other words, the covering that inhibits or prevents the shape-memory material from returning to its original geometry position or being prematurely deployed can be removed by dissolving, e.g. in an aqueous or hydrocarbon fluid, or by thermal degradation or hydrolysis, with or without the application of heat, in another non-limiting example, destruction of the crosslinks between polymer chains of the material that makes up the covering.

In one embodiment, various ratios of polyol to isocyanate are used to provide polyurethane polymers with variable $T_g$s throughout the molded foamed conformable material. This can allow the polymer molded to have unique properties, such as various sections of the downhole tool and/or wellbore device to undergo shaped memory influences as the temperatures change within the wellbore, such as heating up or cooling down. The amount of crosslinking can also be used to affect the Tg of the foamed conformable material for use in filtration or sand control applications. After various target temperatures are experienced, the foamed conformable material can deploy as a screen at various rates, allowing for soft conformable deployments (for example, as an outer layer or layers) reinforced by hard, rigid compacted foam (for example, as an inner layer or layers).

Altering or varying the injection rates during processing can thus allow for imbedded layers of polyurethane with varying levels of $T_g$. Ultimately, the varying $T_g$s will permit parts of the material to be deployed at certain target temperatures while keeping other layers properly altered and "frozen". It will be understood that the portions of the material with different $T_g$s may or may not be in discrete, discernable layers or portions on the tool or device.

In one embodiment of the process, an isocyanate reaction component portion can contain modified MDI MONDUR PC sold by Bayer or MDI prepolymer LUPRANATE 5040 sold by BASF, and a polyol reactant component portion can contain
(1) a linear polycarbonate diol sold by Stahl USA under the commercial name PC-1667;
(2) a tri-functional hydroxyl cross linker trimethylolpropane (TMP) sold by Alfa Aesar;
(3) an aromatic diamine chain extender dimethylthiotoluenediamine (DMTDA) sold by Albemarle under the commercial name ETHACURE 300; (4) a catalyst sold by Air Products under the commercial name POLYCAT 77; (5) a surfactant sold by Air Products under the commercial name DABCO DC198; (6) a cell opener sold by Degussa under the commercial name ORTEGOL 501, (7) a colorant sold by Milliken Chemical under the commercial name REACTINT Violet X80LT; and (8) water.

The equivalent weight of the isocyanate portion is calculated from the percentage of NCO (isocyanate) content. The modified MDI MONDUR PC referred to herein contains 25.8% NCO by weight. Other isocyanates such as MDI prepolymer LUPRANATE 5040 sold by BASF contains 26.3% NCO by weight are also acceptable. The equivalent weight of the polyol portion is calculated by adding the equivalent weights of all reactive components together in the polyol portion, which includes polyol, e.g., PC-1667, water, molecular cross linker, e.g., TMP, and chain extender, e.g., DMTDA. The glass transition temperature of the finished polyurethane foam can be adjustable via different combinations of isocyanate and polyol. In general, the more isocyanate portion, the higher the $T_g$ that is obtained. The amount of crosslinking can also affect the $T_g$ that is obtained.

Another component that can be included in the reaction mixture for the foamed conformable material is a chain extender which, in one specific embodiment is dimethylthiotoluenediamine (DMTDA) sold by Albemarle under the commercial name ETHACURE 300, a liquid aromatic di-amine curative that provides enhanced high temperature properties. Other suitable chain extenders include but are not limited to 4,4'-methylene bis(2-chloroaniline), "MOCA", sold by Chemtura under the commercial name VIBRACURE® A 133 HS, and trimethylene glycol di-p-aminobenzoate, "MCDEA", sold by Air Products under the commercial name VERSALINK 740M.

In certain embodiments, either amine-based or metal-based catalysts are included to achieve good properties of foamed conformable materials. Such catalysts are commercially available from companies such as Air Products. Suitable catalysts that provide especially good properties of polyurethane foam materials include, but are not necessarily limited to, pentamethyldipropylenetriamine, an amine-based catalyst sold under the commercial name POLYCAT 77 by Air Products, and dibutyltindilaurate, a metal-based catalyst sold under the commercial name DABCO T-12 by Air Products.

A small amount of surfactant, e.g., about 0.5% of total weight, such as the surfactant sold under the commercial name DABCO DC-198 by Air Products and a small amount of cell opener, e.g., about 0.5% of total weight, such as the cell opener sold under the commercial names ORTEGOL 500, ORTEGOL 501, TEGOSTAB B8935, TEGOSTAB B8871, and TEGOSTAB B8934 by Degussa can be added into the reaction mixture formulations. DABCO DC-198 is a silicone-based surfactant from Air Products. Other suitable surfactants include, but are not necessarily limited to, fluorosurfactants sold by DuPont under commercial names ZONYL 8857A and ZONYL FSO-100. Colorant can be added in the polyol component portion to provide desired color in the finished products. Such colorants are commercially available from companies such as Milliken Chemical, which sells suitable colorants under the commercial name REACTINT.

In one embodiment, for example, the ratio between isocyanate and polycarbonate polyol is about 1:1 by weight. In one specific embodiment, the polyol portion can be formed by 46.0 g of PC-1667 linear polycarbonate diol combined with 2.3 g of TMP cross-linker, 3.6 g of DMTDA chain extender, 0.9 g DABCO DC-198 surfactant, 0.4 g of ORTEGOL 501, 0.1 g of REACTINT Violet X80LT colorant, 0.01 g of POLYCAT 77 catalyst, and 0.7 g of water blowing agent to form the polyol portion.

A reaction mixture containing the isocyanate portion and the polyol portion can be mixed in a RIM mixer, for example, commercially available from various manufacturers including Gusmer Decker, Cannon, and Krauss Maffei.

The foamed conformable material thus produced by the present process is in its original, expanded shape. The $T_g$ of the material can be measured by Dynamic Mechanical Analysis (DMA) as 94.4° C. from the peak of loss modulus, G". The conformable material can be geometrically altered to at least 25% of original thickness or volume at temperature 125.0° C. in a confining mold. While still in the altered geometric state, the material can be cooled down to room temperature. The shape-memory material is able to remain in the altered geometric state even after applied mechanical force is removed. When the material is heated to about 88° C., in one non-restrictive version, it is able to return to its original shape within 20 minutes.

As may be recognized, a foamed conformable material comprising a shape-memory polyurethane produced from a reaction mixture having more isocyanate than polyol by weight generally results in material having a higher glass transition temperature. (If the polyol to isocyanate ratio is less than one, the rest can be compensated by a crosslinker.) A reaction mixture having less isocyanate than polyol by weight results in lower $T_g$. By formulating different combinations of isocyanate and polyol, different glass transition temperatures of the material can be achieved. Compositions of a shape-memory polyurethane having a specific $T_g$ can be formulated based on actual downhole deployment/application temperature. In one non-restrictive version, the $T_g$s of a shape-memory polyurethane is designed to be about 20° C. higher than actual downhole deployment/application temperatures. Because the application temperature is lower than $T_g$, the material retains good mechanical properties.

When it is described herein that a shape-memory material produced by the present invention can conform to a borehole, what is meant is that the material recovers or deploys to fill the available space up to the borehole wall. The borehole wall will limit the final, recovered shape of the material and, in fact, not permit it to expand to its original, geometric shape. In this way however, the recovered or deployed shape-memory material, will perform the desired function within the wellbore.

The foam that is initially made in the process by forming bubbles in a liquid polymer, which is then cured with the bubbles in place to form the conformable material, can be closed-cell, open-cell, or partially opened-cell, and can have isotropic or anisotropic flow, cell aspect, density or other intrinsic or extrinsic properties. In the case of a closed cell, relatively dense, isotropic elastomer foam, the solid material forming the cell walls is capable of sustaining a certain degree of deformation, at which time the cells walls rupture, but the columns formed between at cell wall intersections do not rupture. Thus, the cellular material can be further processed to provide enhanced flow and filtering characteristics. Cells can be opened, for example by mechanical crushing action. Crushing is known to the art for general cell opening, for instance, by using nip rollers to compress foam, causing the cells to rupture.

As stated above, the foamed conformable material produced according to the present process can be used in a screen assembly for use in a wellbore. In one embodiment, the foamed conformable material can have an internal diameter that allows it to be slipped over a screen material. The assembly of the screen material and the foamed conformable materials can then be slipped over a base pipe. Thereafter, a known expansion tool can be applied internally to base pipe to slightly expand it and, as a result, the screen material and the foamed conformable material are both secured to the base pipe without need for welding. This is advantageous because when the screen is run in the wellbore and expanded, the expansion process can put large stresses on welds that can cause screen failure. An alternative way to provide a screen assembly is to attach the screen material to the base pipe in the manner just described and then to cure the foamed conformable materials right onto the screen material. As another option, a protective outer jacket can be applied over the screen material and the conformable material mounted above. The joining process even with the optional perforated protective jacket is the outward expansion from within the base pipe, as previously described. The outer protective jacket that goes over the screen material protects the screen material when run into the borehole. Such protective jackets are known product that have punched openings and can optionally be used. The foamed conformable material, however, to some degree can provide the desired protection of the screen material during run in.

The microcells in the foamed conformable material, as produced by the present invention, can function to allow formation fluids to pass after expansion. The holes in the screen, which holes can be round, slots, or other shapes or combinations of shapes, can further filter undesirable solids in the formation fluids.

The foamed conformable material made by the present process can be molded into a cylindrical shape, but this can be varied, such as by means of concave ends or striated areas, in order to facilitate deployment, to enhance the filtration characteristics of the layer, or for other reasons.

In one embodiment, a cylindrical foamed conformable layer of material can be incorporated onto a screen of a base pipe or directly onto the base pipe by wrapping a foam blanket with the desired original outer diameter OD1. Alternatively, the process for forming the foamed conformable layer of material on the base pipe or screen can be any other process which results in the foamed conformable layer of material having the desired original diameter. The desired original outer diameter OD1 is larger than the borehole diameter (BHD) in which the assembly will be deployed. For instance, a foamed conformable layer of material having an original outer diameter OD1 of 10 inches might be formed for use in an 8.5 inch diameter borehole.

For instance, the foamed conformable material can be produced to have a transition temperature just slightly above the anticipated downhole temperature at the depth at which the assembly will be used. This can cause the foamed conformable layer of material to expand at the temperature found at the desired depth, and to remain expanded against the borehole wall. Downhole temperature can be used to expand the conformable layer of material; alternatively, other means can be used, such as a separate heat source. Such a heat source could be a wireline deployed electric heater, or a battery fed heater. For example, such a heat source could be mounted to the base pipe, incorporated into it, or otherwise mounted in contact with the foam conformable layer of material. The heater could be controlled from the surface of the well site, or it can be controlled by a timing device or a pressure sensor. Still further, an exothermic reaction could be created by chemicals pumped downhole from the surface, or heat could be generated by any other suitable means.

In one embodiment, the foamed conformable layer material produced by the present process can be made to act as the sole filtration agent without the use of any screen material.

The process of producing the foamed conformable material can leave an impervious coating on the entire outer periphery. The exterior surface that ultimately has contact with the borehole wall, however, can have the impervious layer stripped off or otherwise removed, so that the foamed conformable layer of material can be mounted to a base pipe or a screen and can act solely as the only filtration material or in conjunction with a screen. The screen can be configured exclusively for structural support of the conformable material to keep it from going through the base pipe when well fluids are filtered through it or omitted altogether. Alternatively, the uphole and downhole ends of the foamed conformable material can have the impervious layer from the molding process of manufacturing left on, thereby directing flow to the openings in the base pipe.

EXAMPLES

In the following examples the rotary mixing head was used with an ESCO benchtop metering machine. The impingement mixing head was specially designed, a four-port mixhead, with impingement streams designed to converge at the central axis of the mixing chamber, with Component A entering diametrically opposed to Component B and with each component being injected on two ports.

Example 1

This Example demonstrates how cell size is affected by a rotary mixing head, as characterized by mixing quality. A rotary shearing type mixer, as shown in FIG. 2, was used in a reaction injection molding process such as shown in FIG. 1. The mixing quality was varied from 14.4 cuts/g to 135 cuts/g. The cell size was found to be affected by the mixing quality. The effect of this is seen in the FIGS. 3(a), 3(b), 4(a), and 4(b), and the accompanying Table 1 below.

TABLE 1

| Example | Isocyanate Component °F. | Polyol Component °F. | Mixing parameter, cuts/g | Cell size, mm |
| --- | --- | --- | --- | --- |
| 1a | 84 | 173 | 14.4 | 2.3 |
| 1b | 84 | 172 | 27.0 | 1.8 |
| 1c | 85 | 168 | 45.0 | 1.6 |
| 1d | 85 | 175 | 99.0 | 0.84 |
| 1e | 86 | 169 | 135 | 0.97 |

Figure 3A:
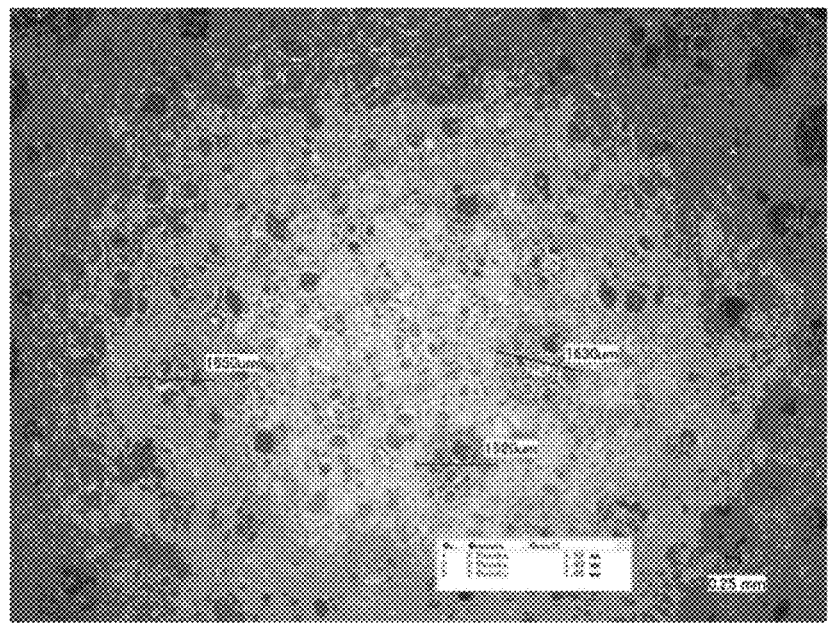
FIGS. 3(a) and 3(b) show photomicrograph images of foamed conformable materials made according to the reaction injection molding process of the present invention, in which the mixing quality was varied from 45 cuts/g to 99 cuts/g, employing rotary mixing, as described in Example 1.
Figure 3B:
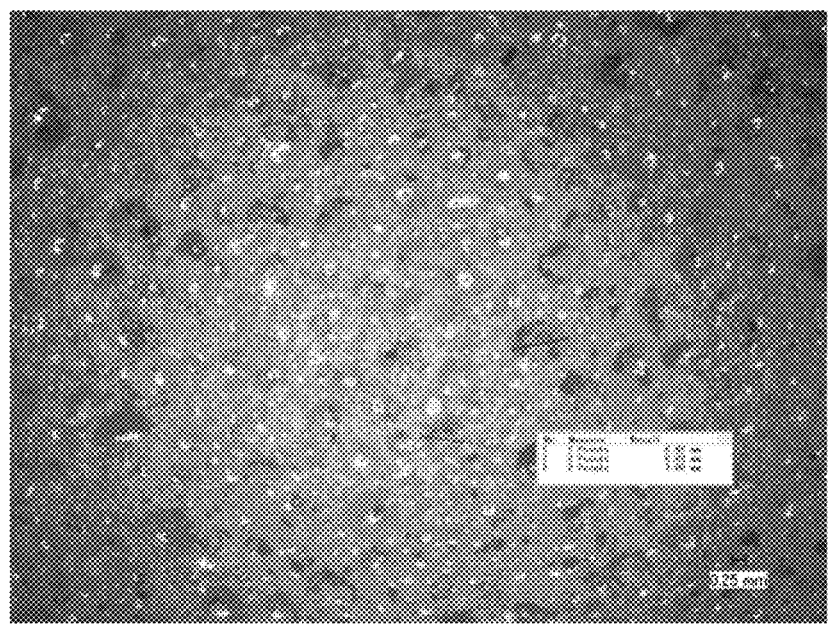

Similarly, FIGS. 3(a) and 3(b) show images of foamed conformable materials made in which the quality of mixing was varied from 45 cuts/g to 99 cuts/g, respectively, corresponding to Examples 1c and 1d in Table 1.

FIG. 4(a) shows a graph of cell size in the resulting product versus polyol temperature for a reaction mixture used in a process according to the present process, whereas FIG. 4(b) shows a graph of cell size versus the mixing measure according to the present process. As the correlation coefficients in these figures show, the correlation on cell size is stronger with the cuts/g than with the temperature of the polyol component. The correlation on cell size is also stronger with the cuts/g than with the temperature of the isocyanate component, although there is a fair correlation ($R^2=0.650$). This last is a not unexpected result, since the blowing reaction involves the isocyanate, so its temperature should affect rate of blowing gas production.

Thus, the quality of mixing parameter has proved to be an effective measure, in various contexts, for use in controlling average cell size of foamed conformable materials.

Example 2

This Example demonstrates how the cell size for a foamed conformable material is affected by quality of mixing in an injection molding process in which an impingement mixing is employed. A reaction injection molding process such as shown in FIG. 1 was carried out using an impingement mixing head in which the mixing quality was varied. The results are shown in Table 2 below.

In the case of jet impingement mixing, the quality of mixing was controlled based on the injection rate of one of the components when the injection rate of the second component must be selected to provide the stoichiometric ratio. The results are shown in Table 2.

TABLE 2

| Example | Pressure psi | Isocyanate Component g/s | Polyol Component g/s | Mixing parameter Iso | Mixing parameter Poly | Cell size |
|---|---|---|---|---|---|---|
| 2a | 1000 | 448 | 500 | 2.2 | 1.9 | Very large |
| 2b | 1000 | 895 | 1000 | 8.9 | 7.8 | Very small |
| 2c | 1000 | 1343 | 1500 | 20 | 18 | Very small |

As shown by the results in Table 2, the cell size was found to be affected by the mixing quality. As the injection rate of polyol increases from 500 to 1000 to 1500 g/s, the foam cells become progressively smaller.

Figure 5A:
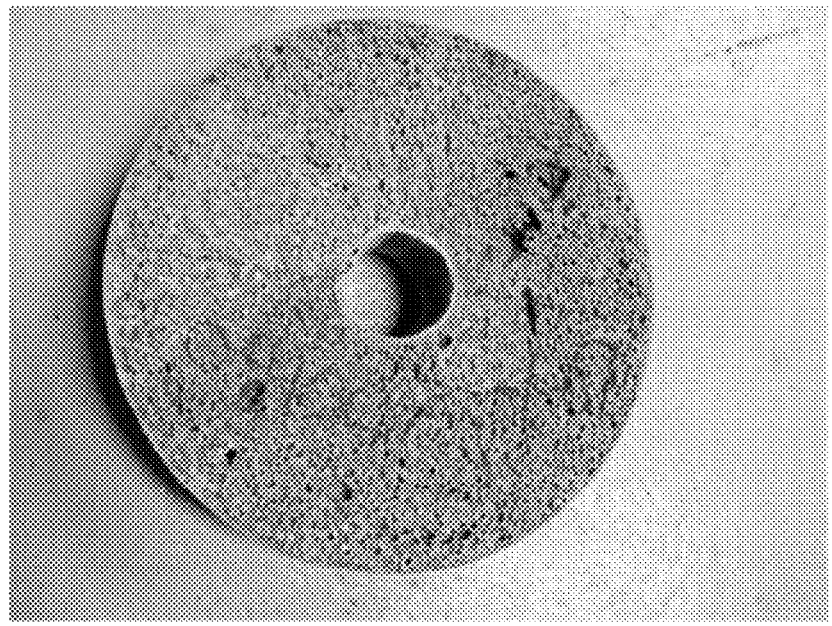
Figure 5B:
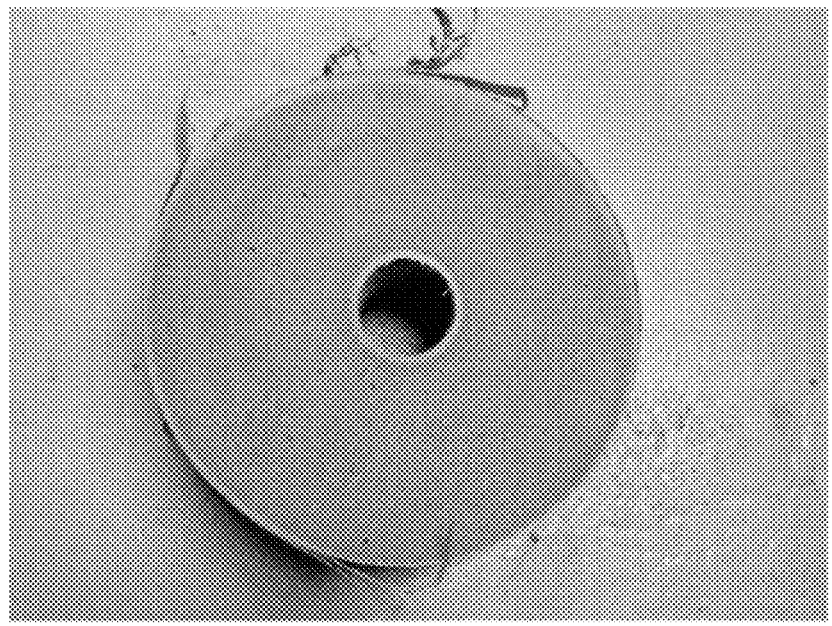
Figure 6A:
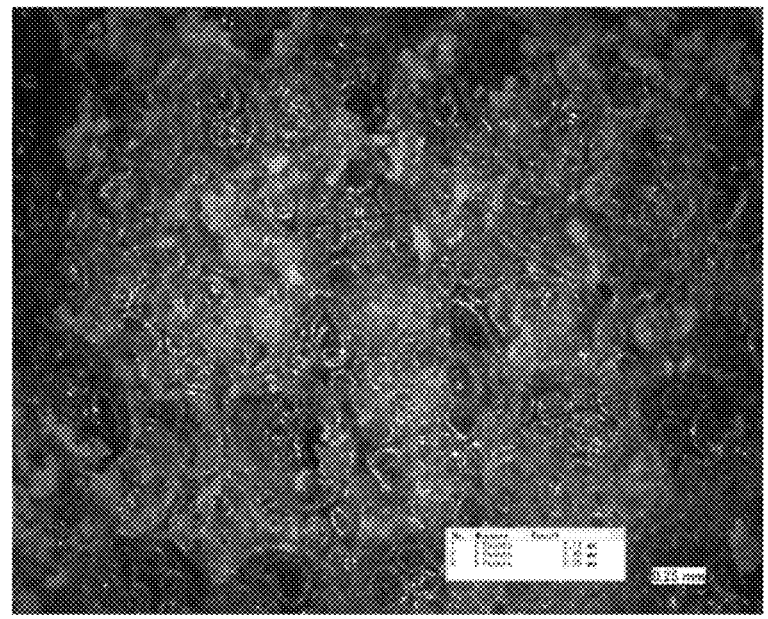
FIGS. 6(a) and 6(b) show photomicrograph images of foamed conformable materials made according to the present invention in which the mixing quality was varied employing jet impingement mixing to produce (a) course cells and (b) fine cells, as described in Example 2
Figure 6B:
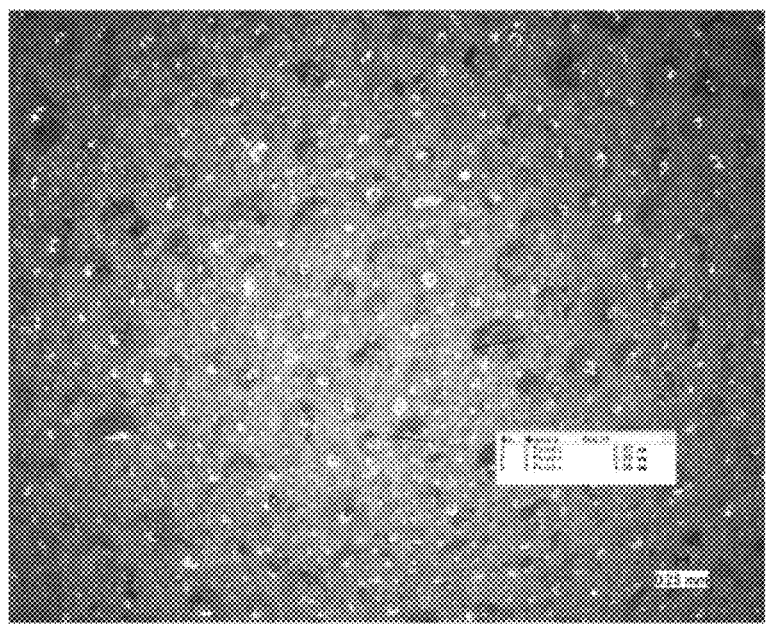

The effect of the mixing quality is also seen in the FIGS. 5(a), 5(b), 6(a), and 6(b). FIGS. 5(a) and 5(b) show images of foamed conformable materials made using the impingement mixing head, in which the mixing parameter was varied to produce (a) course cells and (b) fine cells. FIGS. 6(a) and 6(b) show photomicrography images of foamed conformable materials made according to the present invention in which the mixing quality was varied corresponding to Examples 2a and 2b in Table 2.

It is to be understood that the invention is not limited to the exact details of construction, operation, exact materials, or embodiments shown and described, as modifications and equivalents will be apparent to one skilled in the art. Accordingly, the invention is therefore to be limited only by the scope of the appended claims. Further, the specification is to be regarded in an illustrative rather than a restrictive sense. For example, specific combinations of components to make the polyurethane/urea thermoplastic, particular $T_g$s, specific downhole tool configurations, designs and other compositions, components and structures falling within the claimed parameters, but not specifically identified or tried in a particular method or apparatus, are anticipated to be within the scope of this invention.

The terms "comprises" and "comprising" in the claims should be interpreted to mean including, but not limited to, the recited elements.

The present invention may suitably comprise, consist or consist essentially of the elements disclosed and may be practiced in the absence of an element not disclosed.

The invention claimed is:

1. A process of making a wellbore-conforming filtration material by reaction injection molding, the process comprising:
providing a first component from a first feed tank at a first flow rate, via a first conduit, to a mixing device;
providing a second component from a second feed tank at a second flow rate, via a second conduit, to the mixing device, the second component reactive with the first component, wherein a foaming agent is present in the first component, second component, and/or is separately introduced into the mixing device;
mixing the first component and the second component in the mixing device to form a reaction mixture;
introducing the reaction mixture into an injection molding device; molding the reaction mixture to form a foamed conformable material; and
adjusting the mixing of the first component and the second component to achieve a desired average cell size of the foamed conformable material of 0.2 mm to 7 mm,
wherein adjusting the mixing of the first component and the second component achieves a mixing quality from 14 cuts/g to 150 cuts/g or from 5 kg-m/s$^2$ to 40 kg-m/s$^2$.

2. The process of claim 1, wherein the mixing device comprises an impeller.

3. The process of claim 1, wherein the mixing device comprises a jet impingement mixer.

4. The process of claim 1, wherein the reaction mixture is used to produce diverse foams of different cell size by adjusting the mixing quality.

5. The process of claim 4, wherein the mixing quality is controlled by changing the flow rate of the first component, the flow rate of the second component, or both the flow rate of the first component and the flow of the second component in response to the desired average cell size in the foamed conformable material.

6. The process of claim 1, wherein a viscosity of the reaction mixture is controlled by heating the first component and/or the second component.

7. The process of claim 1, wherein a temperature of the first component and a temperature of the second component, before being introduced into the mixing device, is adjusted, respectively, to a first temperature in the range of 20 to 65° C. and a second temperature in the range of 80 to 115° C.

8. The process of claim 1, wherein a viscosity of the first component and/or the second component are automatically controlled in combination with mass or volume flow rates of the first and second component to affect mixing quality.

9. The process of claim 1, wherein the wellbore conforming filtration comprises a shape-memory material in which the shape-memory material has an altered geometric position and an original geometric position, where the shape-memory material is maintained in the altered geometry at a temperature below an onset glass transition temperature, and where the shape-memory material expands from its alter geometry position to its recovered geometry when it is heated to a temperature above the onset glass transition temperature.

10. The process of claim 1, wherein the foamed conformable material comprises polyurethane.

11. The process of claim 1, wherein the first and second component comprises a polyol and a polyisocyanate, respectively.

12. The process of claim 11, wherein the polyol component comprises a mixture of polyol and water such that $CO_2$ is produced as a blowing agent when reacted with the isocyanate component.

13. The process of claim 11, wherein the polyol component further comprises water, a chain extender, a catalyst, and a surfactant.

14. The process of claim 1, wherein the foamed conformable material allows the foamed conformable material to bridge an annular gap to the wellbore wall without base pipe expansion and filters fluids through said conformable material to said base pipe.

15. The process of claim 1, wherein a process controller is used to adjust the flow rate of the first component and/or second component.

16. The process of claim 15, wherein the process controller is further used to adjust mixing speed of a rotary mixing head to obtain a preselected set point for mixing quality.

17. The process of claim 1, further comprising providing an impervious layer on said foamed conformable material.

18. A process of making a wellbore-conforming filtration material by reaction injection molding, the process comprising:

providing a first component from a first feed tank at a first flow rate, via a first conduit, to a mixing device;

providing a second component from a second feed tank at a second flow rate, via a second conduit, to the mixing device, the second component reactive with the first component, wherein a foaming agent is present in the first component, second component, and/or is separately introduced into the mixing device;

mixing the first component and the second component in the mixing device to form a reaction mixture;

introducing the reaction mixture into an injection molding device;

molding the reaction mixture to form a foamed conformable material; and adjusting the mixing of the first component and the second component to achieve an average cell size of the foamed conformable material of 0.2 mm to 7 mm;

wherein adjusting the mixing of the first component and the second component achieves a mixing quality from 14 cuts/g to 150 cuts/g when the mixing device comprises an impeller or from 5 kg-m/s$^2$ to 40 kg-m/s$^2$ when the mixing device comprises a jet impingement mixer; and wherein a viscosity of the first component and/or the second component are controlled in combination with mass or volume flow rates of the first and second component to affect mixing quality.

19. The process of claim 18, wherein the viscosity of the first component and/or the second component is controlled by heating the first component and/or the second component.

20. The process of claim 18, wherein a temperature of the first component and/or a temperature of the second component, before being introduced into the mixing device, is adjusted, respectively, to a first temperature in the range of 20 to 65° C. and a second temperature in the range of 80 to 115° C.

21. The process of claim 18, wherein the first component comprises a polyisocyanate; and the second component comprises a polyol.

* * * * *